United States Patent [19]

Riemenschneider

[11] Patent Number: 4,484,288
[45] Date of Patent: Nov. 20, 1984

[54] CONVEYOR CONTROL

[75] Inventor: Don H. Riemenschneider, Cincinnati, Ohio

[73] Assignee: Cissell Manufacturing Company, Louisville, Ky.

[21] Appl. No.: 325,218

[22] Filed: Nov. 27, 1981

[51] Int. Cl.³ .............................................. G06G 15/24
[52] U.S. Cl. .................................. 364/478; 364/479; 312/97; 312/268
[58] Field of Search ................ 364/478, 571; 414/134, 414/136; 198/463, 465; 371/20, 16, 17; 312/97, 268

[56] References Cited

U.S. PATENT DOCUMENTS

| | | | |
|---|---|---|---|
| 3,141,123 | 7/1964 | Olson | 318/674 |
| 3,155,889 | 11/1964 | Stiles et al. | 318/602 |
| 3,399,753 | 9/1968 | Revelle | 400/154.3 |
| 3,563,395 | 2/1971 | Gary | 414/136 |
| 3,573,589 | 4/1971 | Berry | 318/601 |
| 3,576,559 | 4/1971 | Gerstenberger | 340/673 |
| 3,644,892 | 2/1972 | Szymber et al. | 340/825.3 |
| 3,716,128 | 2/1973 | Edge et al. | 414/134 |
| 3,840,103 | 10/1974 | Willis | 414/136 |
| 4,018,327 | 4/1977 | Goodman et al. | 198/465 |
| 4,039,918 | 8/1977 | Cheng | 318/602 |
| 4,062,061 | 12/1977 | Batchelor et al. | 371/20 |
| 4,086,469 | 4/1978 | Toriumi et al. | 235/92 MP |
| 4,274,783 | 6/1981 | Eineichner et al. | 414/134 |

Primary Examiner—Raulfe B. Zache
Assistant Examiner—Dale M. Shaw
Attorney, Agent, or Firm—Wood, Herron & Evans

[57] ABSTRACT

A control for positioning an endless conveyor which is movable in a closed path, wherein there is a sequence of designatable locations along the length of the conveyor. The control is responsive to a desired conveyor position input request, which is in terms of a location of said designatable locations, to move the conveyor to the requested position. An actual conveyor position signal is supplied to the control which is indicative of a proportion of a complete traversal of the closed path by the conveyor. An indication of the actual length of the conveyor is stored in the control and is used to convert the desired position request to a desired conveyor position signal indicative of a proportion of a complete traversal of the path by the conveyor. The control then activates a conveyor drive to drive the conveyor until the actual conveyor position signal has a predetermined relationship to the desired conveyor position signal. For example, the conveyor may be driven until these two position signals are equal.

12 Claims, 12 Drawing Figures

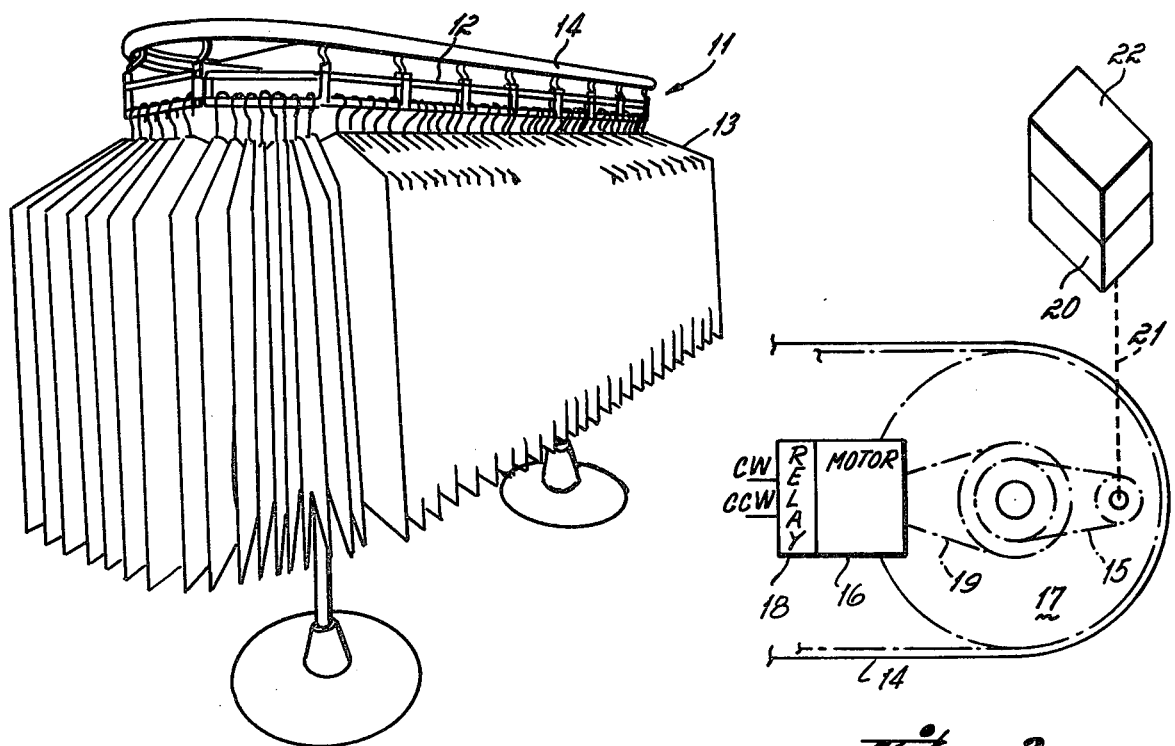
Fig. 1
Fig. 2
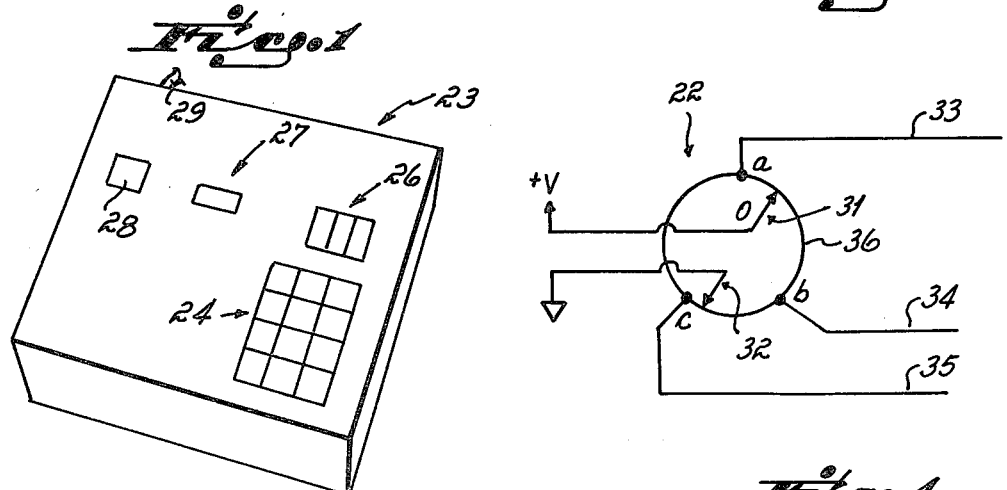
Fig. 3
Fig. 4
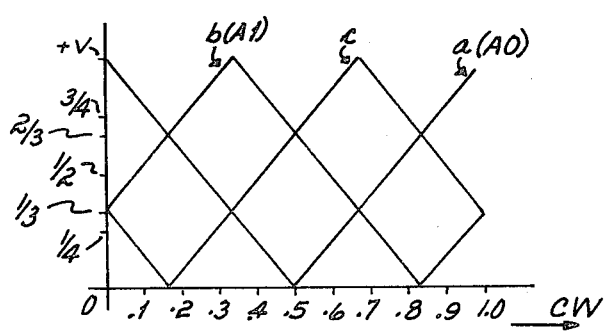
Fig. 5

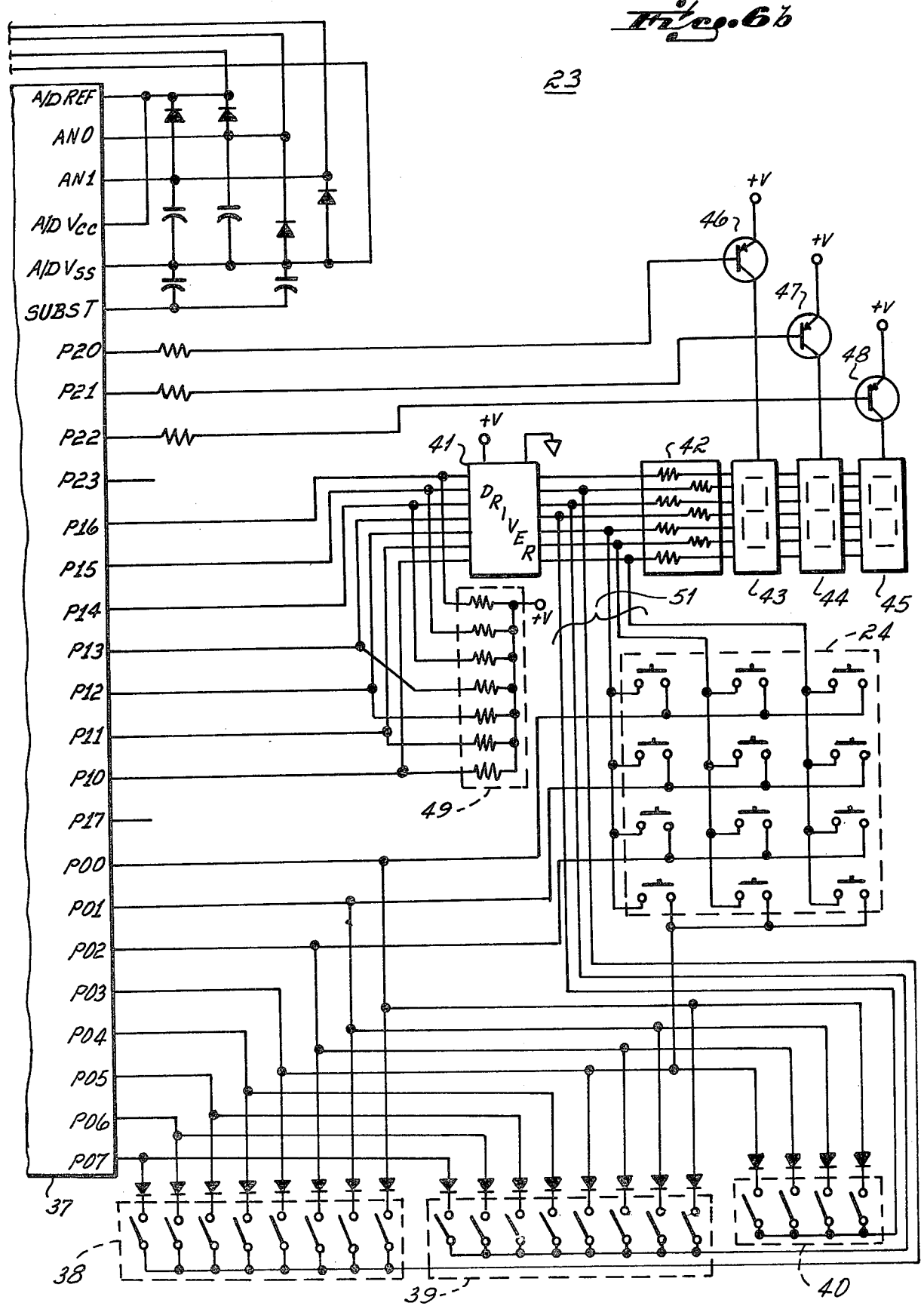

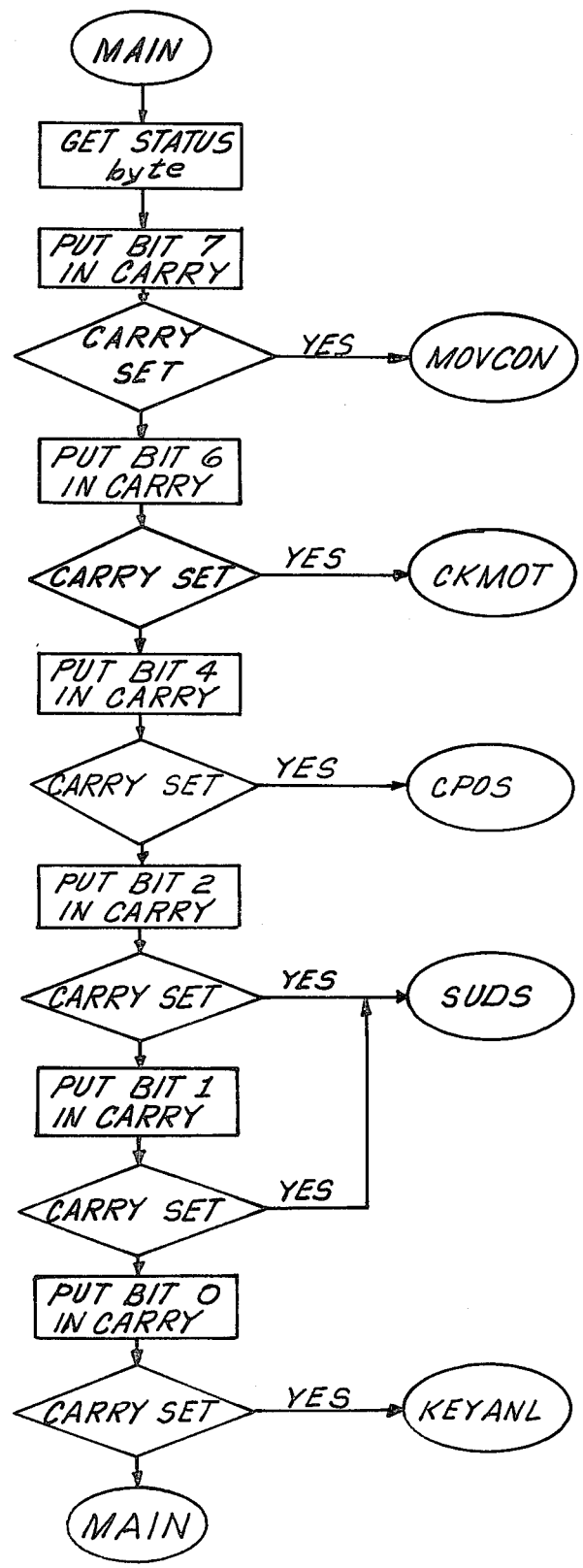

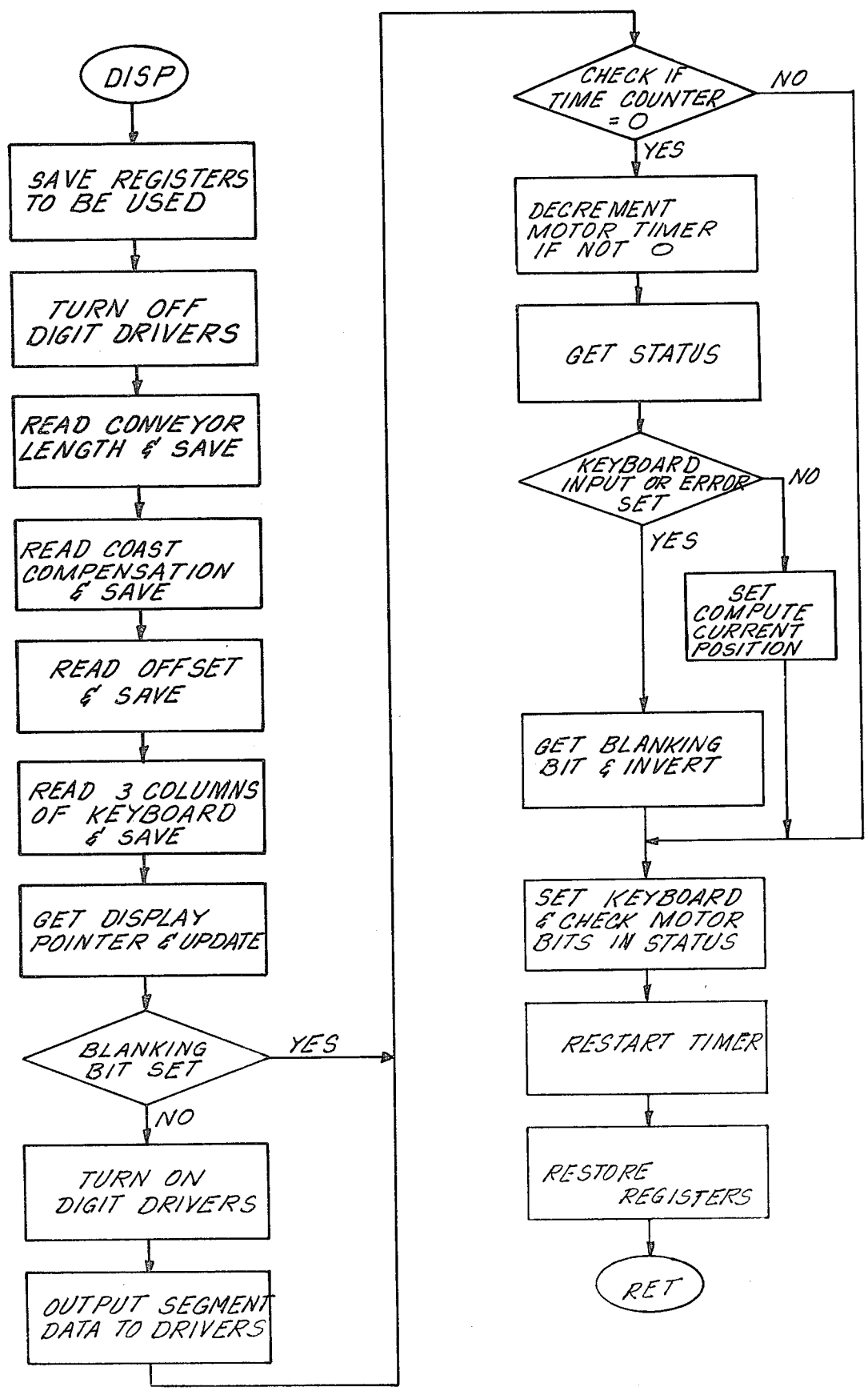

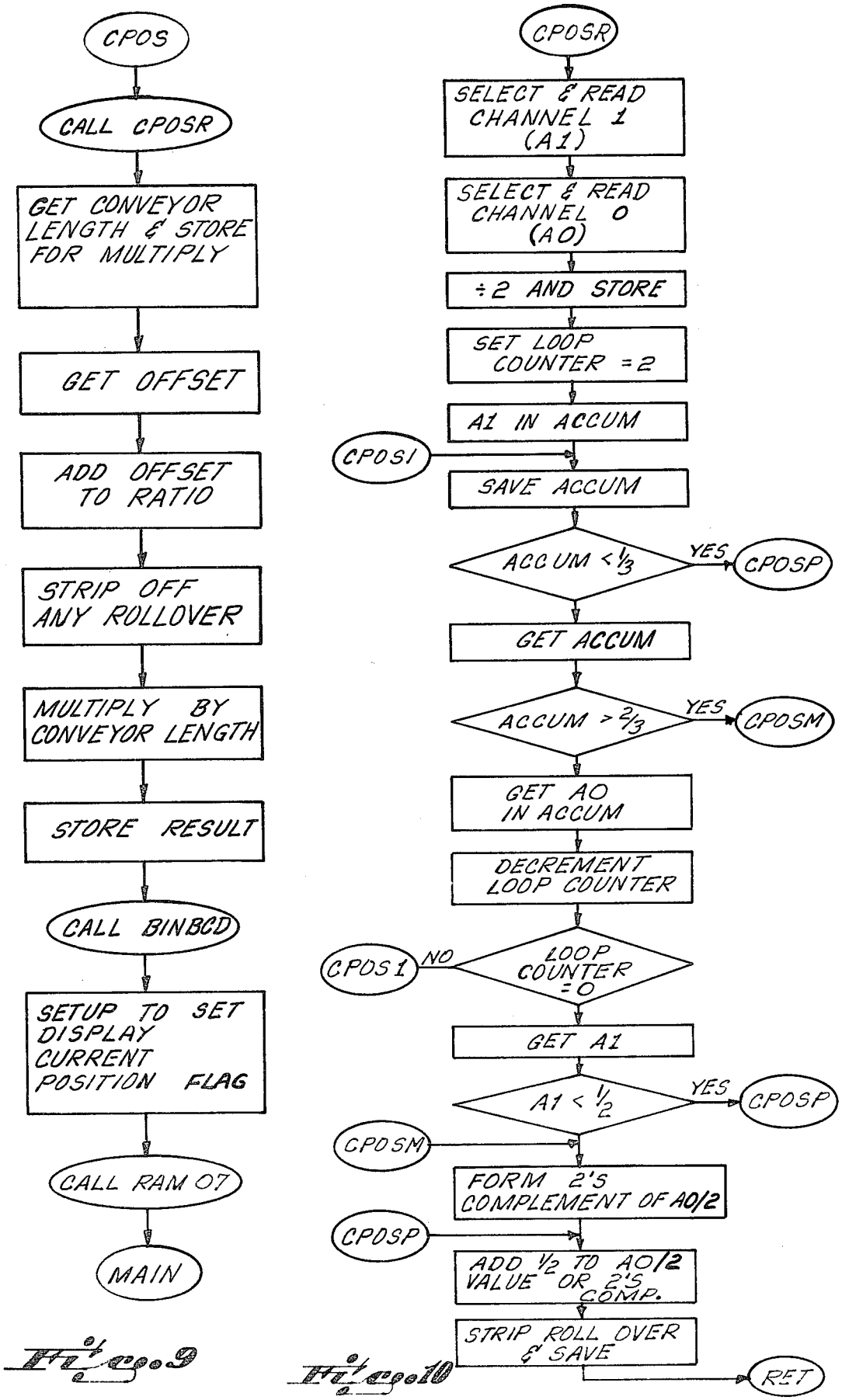

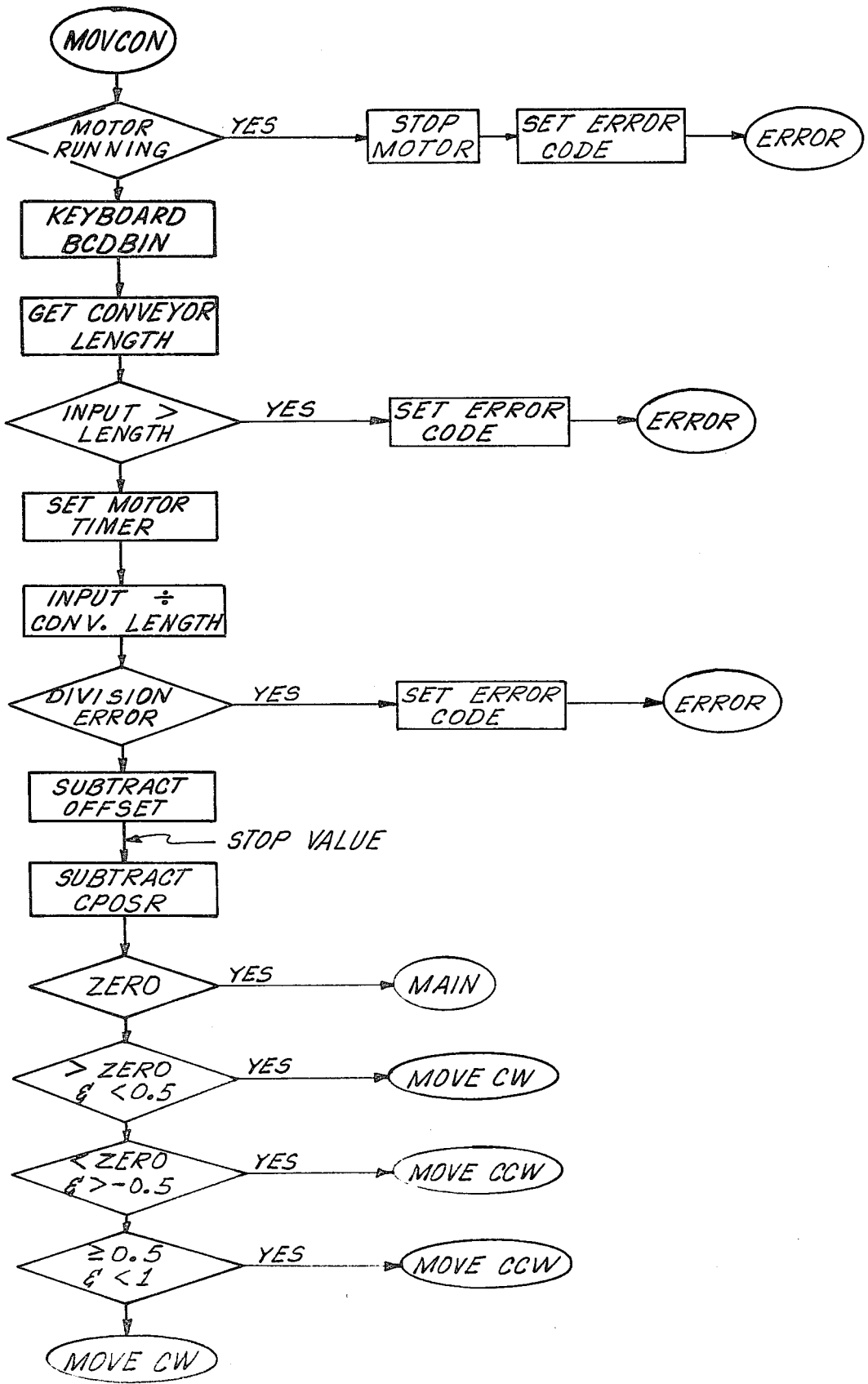

CONVEYOR CONTROL

DESCRIPTION OF THE INVENTION

The invention relates generally to conveyors and more particularly concerns a control for positioning an endless conveyor moving in a closed path.

There are many applications for systems that move objects to desired locations. In many such cases, a conveyor or the like carries objects in a closed path and, in response to an externally applied request, moves along the path to position a particular object at a particular location. Such conveyors may take various forms, and the objects conveyed may be of many different types.

In order for such a conveyor to respond to a request to convey an object to a particular location, it is necessary to drive the conveyor to the appropriate position. The appropriate position for the conveyor depends upon the location of the object on the conveyor and the location along the conveyor path where the object is desired.

An illustrative type of conveyor system, which will be described below with regard to an exemplary embodiment of the present invention, is a call counter conveyor used in a laundry or dry cleaning establishment. In such a system, an endless chain is mounted above the floor for movement about a closed path which is usually, but not always, in a generally horizontal plane. The conveyor is a chain which is divided into links, which are structured to carry cleaned garments on hangers. The links or portions thereof of the conveyor chain are typically designated by numbers in order to establish a series of locations along the chain for the placement of garments bearing correspondingly numbered tags or the like.

A call counter conveyor is usually arranged so that a portion of the conveyor path moves past a call counter at which the garments are picked up by customers of the dry cleaning establishment. An employee of the cleaning establishment working at the call counter usually receives a numbered receipt from a customer and must select the correspondingly numbered garment from among those stored on the call counter conveyor. In order to obtain the garment without leaving the call counter area, the employee activates a drive motor to drive the conveyor along its closed path until the garment is located at the call counter.

One method for appropriately moving the conveyor chain is for the employee to activate the chain drive while observing the number designations on the links of the conveyor chain as it is moving. When a number on a chain link corresponding to that of the desired garment reaches the call counter, the conveyor drive is de-activated, and the garment removed from the conveyor. The control for the drive in this case may be, for example, a footswitch which may permit forward and backward (clockwise and counterclockwise) movement of the conveyor.

In one prior system, a control is provided to permit the employee of the dry cleaning establishment to select on a dial a desired numbered location from among those along the conveyor. The control activates the conveyor drive to move the requested location on the conveyor to the call counter. In this prior conveyor control system, a potentiometer resolver is used which is coupled through appropriate gearing to the conveyor drive to produce an output signal which is indicative of a proportion of a complete traversal of the closed path by the conveyor. The prior art call counter control has a similar potentiometer, and the control includes a differential amplifier circuit for comparing the two groups of potentiometer outputs. The control cooperates with the conveyor drive in a servo-loop to drive the conveyor until the two sets of potentiometer outputs are nulled. In such a system, a dial plate must be provided for the potentiometer control which is unique to the size of the conveyor with which the control is to be used. In addition, such potentiometer controls are subject to considerable wear over a period of time, and in use, the analog scale of conveyor locations on the dial plate must be carefully selected each time the control is used. There is also no provision with such a control for providing an indication at the control of the present location of the conveyor. The position of the conveyor need not correspond to the most recent control setting because, typically, the conveyor may be operated by a drive switch other than one associated with the control.

In other types of systems for conveying articles to particular locations, the technique has often been adopted of uniquely identifying particular locations on the conveyor as carrying particular objects. In these systems, the exact location of each conveyor compartment or link or the like is stored and processed in the control. Such a technique generally requires a large amount of memory associated with the control in order to accommodate the necessary record keeping for a large number of conveyor locations. An even more complicated type of conveying system makes use of identifying codes applied to particular locations on the conveyor. These unique codes are then read by some type of scanning or reading mechanism at a location along the path of the conveyor. Such code readers are expensive and can obstruct access to the conveyor.

Consequently, it is the general aim of the invention to provide an improved conveyor control for conveyor systems of the foregoing type. It has been an object of the invention to provide such an improved control which does not require means for uniquely identifying to, or within, the control any designations of particular locations along the conveyor. An improved control in accordance with the present invention further provides means for storing and subsequently utilizing an indication of the length of the conveyor whose position is being controlled. In this way the control is readily adaptable to conveyors of different lengths without the need for any significant modification of the control.

These objectives have been accomplished in accordance with certain principles of the invention by providing a control which operates upon not only an actual conveyor position signal which is indicative of a proportion of a complete traversal of a closed path by a conveyor, but also a desired conveyor position signal which is similarly indicative of a proportion of a complete travesal of the path by the conveyor. This is accomplished by storing and utilizing an indication of the length of the conveyor in order to modify an externally supplied indication of a desired conveyor position which is presented in terms of a particular designated location along the conveyor.

Other objects and advantages of the invention, and the manner of their implementation, will become apparent upon reading the following detailed description and upon reference to the drawings, in which:

FIG. 1 is a perspective view of a call counter conveyor with garments carried thereon;

FIG. 2 is a diagrammatic view of a drive system and potentiometer position sensor for the conveyor of FIG. 1;

FIG. 3 is a perspective view of a control housing encompassing a conveyor control in accordance with the present invention;

FIG. 4 is a schematic diagram of the electrical equivalent of the position sensing potentiometer of FIG. 2;

FIG. 5 is an illustration of the three output waveforms of the potentiometer of FIG. 4;

Figure 6A:
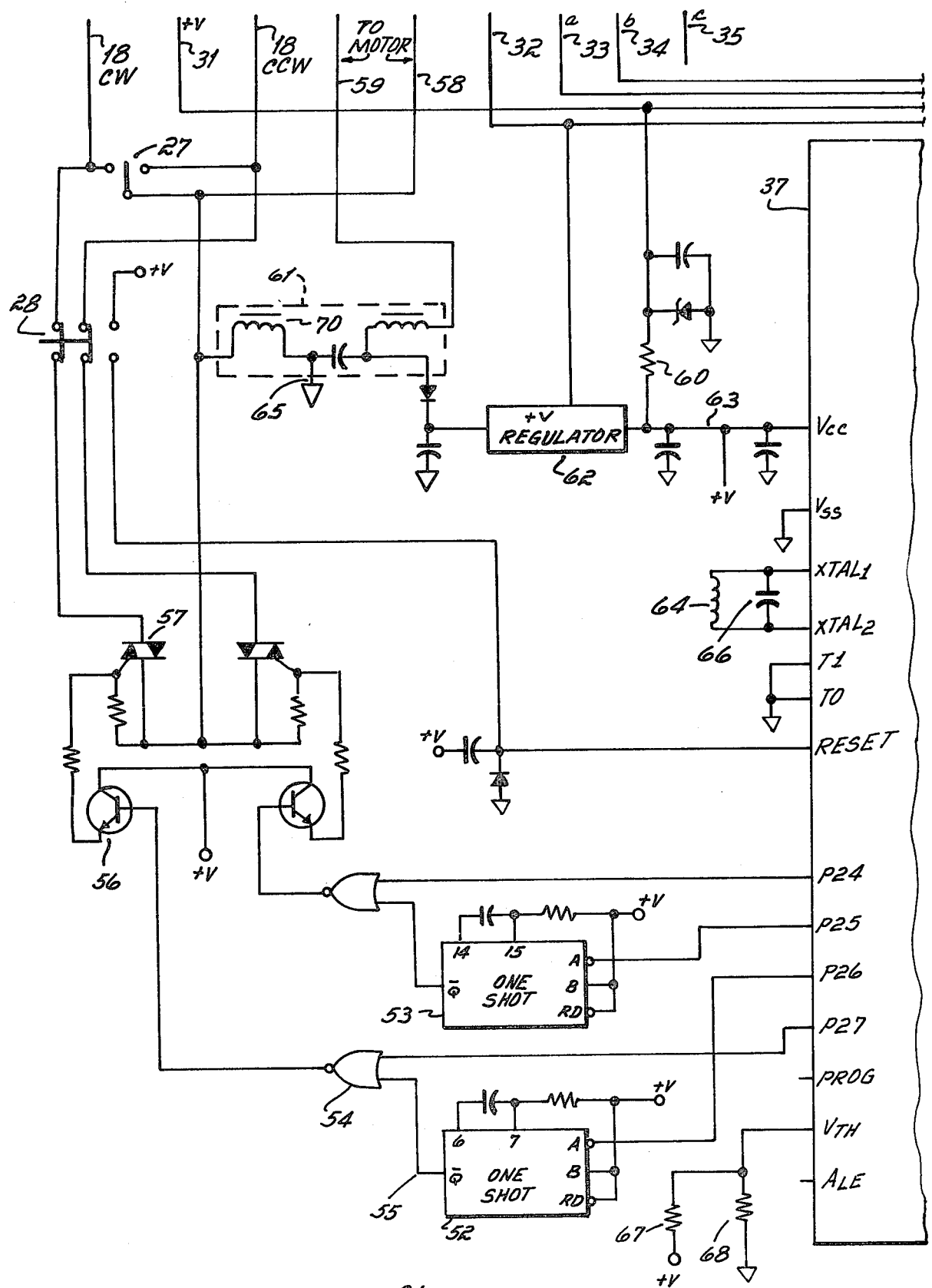

FIG. 6a and 6b, when combined to form FIG. 6, is a schematic diagram of the circuitry of a conveyor control in accordance with the present invention;

FIG. 7 is a flow chart of the MAIN sequence of operation of the microcomputer of FIG. 6;

FIG. 8 is a flow chart of the sequence of operation of the interrupt routine of the microcomputer;

FIG. 9 is a flow chart of the routine for determining the conveyor position;

FIG. 10 is a flow chart of the subroutine for determining the proportional value of the conveyor position; and FIG. 11 is a flow chart of the routine for driving the conveyor.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as defined by the appended claims.

Turning first to FIGS. 1 and 2, a dry cleaning call counter conveyor 11 comprises an endless chain made up of links 12, the lower portion of which are adapted to receive hangers carrying garments 13 which have been dry cleaned. The links 12 of the conveyor 11 are guided along a closed path by a rail 14 and driven by a motor arrangement 16 through a conveyor drive sprocket 17. The motor arrangement 16, including a motor and associated gearing and power supplies, etc., is usually mounted interiorly of the rail 14 at approximately the same height.

The motor is controlled to be driven in either the clockwise or counterclockwise direction by means of a reversing relay arrangement 18 which is coupled to the motor. When the motor arrangment 16 drives the sprocket 17 by means of a chain 19 to move the conveyor, it also provides a geared down drive by means of a chain 15 to a gearbox 20 which drives a potentiometer shaft 21 which is received within a potentiometer box 22. The gearing between the motor and the potentiometer shaft 21 is such that one complete revolution of the conveyor corresponds to one complete revolution of the potentiometer shaft 21.

As thus far described, the conveyor system corresponds generally to certain existing conveyor systems. In these systems, the outputs of the potentiometer box 22, indicative of conveyor position, are utilized in an analog comparison amplifier circuit to produce an error signal between a desired conveyor position and an actual conveyor position. In response to this error signal, the conveyor drive motor is activated to move the conveyor 11 to reduce the error signal and thereby to bring the actual conveyor position into conformity with the desired position.

In FIG. 3, there is illustrated an improved control 23 constructed in accordance with the present invention. The control 23 conveniently cooperates with the prior art potentiometer box 22 to automatically control the movement of a conveyor to a selected position. The control 23 includes a keyboard 24 for entering a desired conveyor location and a three digit display 26 for displaying actual and desired conveyor positions, and other information such as error codes as shall be described hereinafter. The control further includes a rocker switch 27 for manually actuating the motor to drive the conveyor either clockwise or counterclockwise, and an emergency stop switch 28. A cable 29 comprising eight conductors couples the control 23 to the motor arrangement 16 and to the outputs of the potentiometer box 22. The structure and function of the control 23 shall be described in more detail hereinafter with regard to a circuit diagram of the control and flow charts illustrative of the functions of the control.

While the control 23 conveniently cooperates with the existing potentiometer box 22, other means may be utilized for providing a conveyor position signal to the control. It is preferred that, whatever the position sensor used, the actual conveyor position signal of the sensor should be indicative of a proportion of a complete traversal of the closed path by the conveyor. In the present instance, the control 23 will be described in conjunction with the existing potentiometer box 22 for indicating conveyor position. In this regard, an understanding of the nature of the output signals at the outputs of the potentiometer 22 is necessary in order to consider the operation of the control 23 in detail.

As shown in FIG. 4, the potentiometer 22 includes a first wiper arm 31 connected to a positive voltage supply and a second wiper arm 32 connected to common. The two wiper arms 31 and 32 are mechanically connected in a straight line to be 180° out of phase. The wiper arms 31 and 32 are mechanically coupled to the potentiometer shaft 21 and rotate therewith. There are three output lines 33, 34 and 35 carrying output signals a, b and c, respectively. The three output lines are connected to an annular resistive element 36 of the potentiometer 22 at positions which are 120° apart from one another. As the wiper arms 31 and 32 rotate in the potentiometer 22, the voltage at each of the points a, b and c varies linearly with the position of the wiper arms.

The three output waveforms of the potentiometer 22 are illustrated in FIG. 5. The waveforms vary between 0 and the input voltage value of +V over a range of proportional positions of the potentiometer shaft 21 (and therefore, of the conveyor 11) between 0 and 1. The reference point, or 0 position, for the potentiometer shaft is arbitrarily chosen to be at the location at which the wiper arm 31, which is coupled to +V, is adjacent the connection of the line 33 to the potentiometer ring 36. It can be demonstrated that for the purposes of the control 23, any two of the three waveforms a, b and c uniquely define the position of the potentiometer shaft 21. As shall be described hereinafter, the signals a and b, designated A0 and A1 respectively, shall be utilized as inputs to the control 23 for the purpose of determining the actual position of the conveyor 11.

Referring now to FIG. 6, the control 23 comprises a microcomputer chip 37 and associated circuitry to form a microcomputer-based conveyor control. The microcomputer, or processor, 37 is an Intel 8022 custom integrated circuit. There are several inputs to the processor 37 on an input bus connected to the input ports P00 through P07. A first group of inputs to the processor 37 is from the keyboard 24. In addition, there are three sets of slide switches 38, 39 and 40 coupled to the input bus of the processor 37. The slide switches 39 are set in accordance with the conveyor length. The slide switches 38 establish a conveyor offset. This offset compensates for the differential between the position of the conveyor at the zero-reference point of the potentiometer 22 and the position of the conveyor when the zero-designated location on the conveyor links is at the call counter, or wherever the control is located. The set of switches 40 establishes a coast compensation factor to allow for conveyor travel during the lag between the time that the processor outputs a signal to de-energize the conveyor drive motor and the time that the conveyor actually stops. The methods for setting these groups of slide switches shall be discussed hereinafter.

The diodes and capacitors at the analog-to-digital converter inputs of the processor 37 are provided for protection and filtering, in accordance with conventional practice.

Another group of inputs to the processor 37 are the connections from the potentiometer 22. These inputs are coupled to an analog to digital converter portion of the processor 37. As indicated earlier, one output signal line from the potentiometer is not used. In the present instance, this unused line is the line 35. The output from the potentiometer line 33, signal a, serves as the A0 input to the analog-to-digital (A/D) converter of the processor, and the potentiometer output 34, the signal b, serves as the A1 input.

The voltage +V for the potentiometer wiper arm 31 is produced by the control 23, as shall be described in more detail hereinafter. In order to track any voltage variations in the potentiometer supply voltage, the analog to digital converter uses an analog voltage range between 0, or common, and the potentiometer supply voltage. In order to do this, the +V potentiometer line from the wiper 31 is connected to a zener-regulated supply and to the A/D REF input of the processor 37. The potentiometer common line, from the wiper arm 32, is connected to the A/D input $V_{SS}$. The analog input signals A0 and A1 are the waveforms represented in the graph of FIG. 5. The manner in which the processor develops these waveforms into an actual conveyor position signal shall be discussed hereinafter.

One group of outputs from the processor 37 is provided on an output bus P10–P17. These outputs are coupled through a driver 41 and a group of current limiting resistors 42 to the three sections 43, 44 and 45 of a three digit LED display. As shall be explained in regard to the operation of the processor 37, only one of the three digits is displayed at any given instant. In order to select the particular digit being displayed, the appropriate driver transistor 46, 47 or 48 is activated by the processor on an output line P20, P21 or P22, respectively. The circuit power supply +V, which in the illustrated circuit is +5 volts, is coupled through a group of resistors 49 to the input lines of the driver 41 in order to provide sufficient drive for the Darlington transistors in the driver 41. The driver 41 is a Motorola type MC1413 integrated circuit.

Six of the output lines of the driver, indicated collectively as lines 51, serve an additional function on an intermittent basis, when the LED digits 43–45 are not activated. In performing this alternate function, one of the six driver output lines 51 is activated by the processor 37 to enable, or address, one of the groups of inputs to the input ports P00–P07 of the processor 37. Thus, one of the three columns of keys in the key pad 24 may be enabled, or one group of the three groups of slide switches 38–40.

In a manner to be described, the processor 37 activates the reversing relay 18 which is coupled to the motor arrangement 16 to drive the motor to move the conveyor in either a clockwise or a counterclockwise direction by continuously firing either a one shot multivibrator 52 (for clockwise movement) or a one shot multivibrator 53 (for counterclockwise movement). In this way, if there is a failure in the processor 37, the motor will stop since the succession of pulses from the multivibrator will cease. The two multivibrators are each one half of a type 74123 integrated circuit.

In activating the conveyor motor, in the clockwise direction for example, the processor 37 fires the one shot multivibrator 52 during each repetition of one of its routines. The multivibrator 52 provides an output pulse of approximately 10 milliseconds in duration each time it is triggered. When the conveyor is moved by the control, the multivibrator is retriggered continuously by a series of pulses from the processor which occur at a more frequent interval than 10 milliseconds. The $\overline{Q}$ output 55 of the multivibrator 52 is one input to a NOR gate 54, whose other input is normally low as supplied by the processor 37. When the multivibrator 52 is fired, the input 55 to the NOR gate 54 goes low, and the output of the gate goes high, turning on a transistor 56 and firing a triac 57. Firing the triac 57 couples the clockwise input of the reversing relay 18 (FIG. 2) to the ac common 58 of a power supply of the motor arrangement 16, and the motor is activated to drive the conveyor in the clockwise direction. The triac 57 is a logical triac in that it is operative to be fired in all four electrical quadrants. The operation of the circuit for counterclockwise movement of the conveyor is identical to that for clockwise movement, and therefore, shall not be described in detail.

The rocker switch 27 for manually activating the conveyor motor is operable to couple either the clockwise or the counterclockwise input to the reversing relay 18 to the ac common 58. This manual control of the conveyor movement is separate from that controlled by the processor 37. The emergency stop switch 28 is operable to deactivate the conveyor motor by opening both of the lines coupling the triacs to the reversing relay. At the same time, a reset pulse is supplied to the RESET terminal of the processor 37.

In the present case, the motor arrangement has an ac supply which is a 24 volt supply available to the conveyor motor and which is also used to produce the five volt power supply for the control circuit 23. The 24 volt ac common line 58 serves as the above-mentioned common for the triacs. The other 24 volt ac line 59 is coupled through a noise filter arrangement indicated generally as 61, rectified, and regulated by a five volt regulator 62. The regulator 62 is a type 7805 integrated circuit. The regulated five volt supply for the logic circuitry is provided on a line 63. The supply 63 is coupled through a resistor 60 to the zener-regulated supply for the A/D REF input to the processor 37. The 24 volt ac common line is separated from the circuit common 65 for the control circuit 23 by an inductor 70 in the noise filter arrangement 61.

An inductor 64 is connected in parallel with a capacitor 66 and coupled to the XTAL inputs of the processor 37 to establish an internal clock frequency on the order of two megahertz for the processor. In the present instance, the inductor is 33 microhenries and the capacitor is 47 picofarads. The resistors 67 and 68, connected at their common point to the $V_{TH}$ input of the processor 37, form a voltage divider between the volt logic supply +V and common. In this case, the resistors are each 1000 ohms, coupling about 2.5 volts to the $V_{TH}$ input of the processor 37. The voltage at $V_{TH}$ sets the input threshold for the input ports P00-P07.

Referring now to FIG. 7, the MAIN sequence of operation of the processor 37 is illustrated in flow chart form. This MAIN sequence is interrupted on a regular basis in order for the processor to execute a DISPLAY routine, to be described hereinafter. The first step of the MAIN program is to read the status byte. The status byte is contained in a register, in this case RAM 07, of the processor 37. The eight bits of the status byte correspond to the following routines or indications: b7-MOVE CONVEYOR; b6-CHECK MOTOR; b5-ERROR BEING DISPLAYED; b4-COMPUTE CURRENT POSITION; b3-KEYBOARD CURRENTLY INPUTTING; b2-DISPLAY CURRENT INPUT; b1-DISPLAY CURRENT POSITION; and b0-ANALYZE KEYBOARD. Two of the bits, b5 (ERROR BEING DISPLAYED) and b3 (KEYBOARD CURRENTLY INPUTTING), refer to status information and do not call for the execution of a routine. In regard to the balance of the bits in the status byte, each of these bits corresponds to a routine to be executed by the processor. Each time the MAIN routine begins, the status byte is checked and the bits are examined in sequence (7, 6, 4, 2, 1, 0). The first bit exhibiting a set condition initiates the execution of the corresponding routine. Whenever one of these routines is concluded, the main routine begins again to examine the bits of the status byte in the same order. Thus, there is a hierarchy of the routines, and the KEYANL routine (KEYBOARD ANALYSIS) is executed only if none of the other bits in the status byte are in the set condition when the MAIN program is initiated. If none of the bits are in the set condition, the MAIN program returns and is again executed.

As indicated earlier the length of the conveyor, and the offset of the conveyor from a designated zero location (such as at the call station) when the proportional position indicated by the potentiometer 22 is at zero, are stored for the processor by means of slide switches. As a basis for many of the routines of the processor, the actual proportional position of the conveyor must also be determined from the input signals from the potentiometer 22. As used herein, the phrase proportional position means a proportion of a complete traversal of the conveyor path by the conveyor. A proportional position shall typically be a quantity between zero and one. Such quantities as conveyor offset and coast compensation are generally referred to herein as proportional position quantities. A desired conveyor position, input through the keyboard, is not a proportional position, but a desired proportional position is derived by the processor internally.

The CPOSR subroutine illustrated in FIG. 10 determines the actual proportional position of the conveyor on the basis of the output signals from the potentiometer 22. The processor 37 is connected to two of the three output channels of the potentiometer, those producing the waveforms labeled a and b in FIG. 5. The waveform a shall be referred to herein as A0, and the waveform b shall be referred to herein as waveform A1 in order to conform to the corresponding designations of the analog to digital input ports of the processor 37.

In order to understand the operation of the CPOSR subroutine, reference must first be made to the waveforms of FIG. 5 to be considered in conjunction with the flow chart of FIG. 10. The CPOSR subroutine begins by selecting, reading and storing the A1 and A0 values. The A0 value is then divided by two and this A0/2 value is also stored. A loop counter is then set to two.

The routine then functions to determine the proportional position of the conveyor using a formula that the position is equal to $\frac{1}{2}$ plus or minus A0/2. The value of A1 is first used to determine whether the plus or minus sign is used in the formula. If A1 is greater than $\frac{2}{3}$, then the minus sign applies; and if A1 is less than $\frac{1}{3}$, then the plus sign applies. If neither of these conditions is true (A1 greater than $\frac{2}{3}$ or less than $\frac{1}{3}$) then the value of A0 is used to determine the sign, plus or minus, in the formula. If A0 is greater than $\frac{2}{3}$, then the minus sign applies; and if A0 is less than $\frac{1}{3}$, then the plus sign applies.

In order to determine the actual proportional position of the conveyor, the A1 value is first compared to $\frac{1}{3}$, and if it is less than $\frac{1}{3}$, the subroutine jumps to CPOSP. As can be seen from FIG. 5 for this value of A1, the proportional position is between $\frac{2}{3}$ and 1. In this region, the A0 curve has a positive slope of 2 and crosses the position axis at a position of $\frac{1}{2}$. Therefore, $\frac{1}{2}$ is added to the stored value of A0/2 to establish the correct proportional position for the conveyor.

If the A1 value is not less than $\frac{1}{3}$, it is compared with $\frac{2}{3}$ to determine if A1 is greater than $\frac{2}{3}$. This corresponds to the portion of the A1 curve lying between 1/6 and $\frac{1}{2}$. If A1 is greater than $\frac{2}{3}$, the routine jumps to CPOSM. The 2's complement of the A0/2 value is formed. This in effect produces $-A0/2$. It can be seen from FIG. 5 that, over the position interval from 1/6 to $\frac{1}{2}$, the A0 curve has a slope of $-2$ and again intersects the position axis at $\frac{1}{2}$. Therefore, subtracting A0/2 from $\frac{1}{2}$ yields the correct value for the proportional position of the conveyor.

This leaves substantially only two segments of the A1 curve as yet indeterminate. These sections are the portion from 0 to 1/6 and the portion from $\frac{1}{2}$ to $\frac{2}{3}$. In both of these portions, the A1 value lies between $\frac{1}{3}$ and $\frac{2}{3}$.

Therefore, if neither of the two above described comparisons for the A1 signal have led to a proportional position value, the subroutine next places A0 in the accumulator and decrements the loop counter. At this point, the loop counter is set at 1, and the subroutine returns to CPOS1. A0 is now compared to $\frac{1}{3}$. If A0 is less than $\frac{1}{3}$, then the corresponding position is between $\frac{1}{2}$ and $\frac{2}{3}$. Since the segment from $\frac{1}{3}$ to $\frac{1}{2}$ has already been dealt with in regard to A1, the indicated position must be between $\frac{1}{2}$ and $\frac{2}{3}$. The subroutine then jumps to CPOSP once again, and $\frac{1}{2}$ is added to the stored A0/2 value. This yields a correct position result since, again, the point must lie along the portion of the A0 curve having a positive slope.

If A0 is not less than $\frac{1}{3}$, it is then compared to $\frac{2}{3}$ to see if it is greater than $\frac{2}{3}$. A0 is greater than $\frac{2}{3}$ along the positions 0 to 1/6 and 5/6 to 1. Since the positions from 5/6 to 1 were dealt with in regard to the A1 comparisons, if A0 is greater than $\frac{2}{3}$, the corresponding conveyor position must be between 0 and 1/6. The subroutine then jumps to CPOSM, and A0/2 is subtracted from $\frac{1}{2}$. Again, this is the correct result, since this segment of A0 is the portion of the A0 curve having a negative slope.

There are only two indeterminate points remaining after the above-described operation of the CPOSR subroutine. These points are the two points where the A0 and A1 curves intersect. In either of these cases, the subroutine again decrements the loop counter, and the loop counter is now equal to 0. The subroutine then recalls A1 and determines if A1 is less than $\frac{1}{2}$. If A1 is less than $\frac{1}{2}$, the intersection point is at a position of $\frac{2}{3}$, and the subroutine goes to CPOSP. If A1 is not less than $\frac{1}{2}$, the intersection point is at a position of 1/6, and the subroutine is then at the appropriate CPOSM stage.

In all cases after the determination of a proportional conveyor position, any rollover is stripped from the resultant value and the actual conveyor proportional position is stored. The processor then returns to whatever routine called for CPOSR.

This subroutine CPOSR is used in several of the processor routines for obtaining a current actual proportional conveyor position for other calculations. For example, the COMPUTE POSITION (CPOS) routine illustrated in flow chart form in FIG. 9, begins by calling the CPOSR subroutine. The COMPUTE POSITION routine determines the position of the conveyor in terms of the designated locations on the conveyor itself.

In executing the CPOS routine, after the proportional conveyor position is determined, the conveyor length is obtained and stored for subsequent multiplication. Next, the offset, which is set on the slide switches 38 in terms of relative conveyor position, is added to the proportional conveyor position, or ratio, to produce a proportional conveyor value taking into account the offset of the conveyor, from a nominal zero of the potentiometer 22, at the position of the control, such as the call counter. If the summation of the offset and the ratio exceeds one, the roll-over is stripped off to retain only the fractional amount. This result is then multiplied by the stored conveyor length, and this result is stored. The conveyor length is now in terms of the actual location designations along the length of the conveyor. This position number is then converted to binary coded decimal to be used by the display drivers. The DISPLAY CURRENT POSITION bit, bit 1, of the status byte is then placed in the set condition in the RAM07, and the routine returns to the MAIN program.

In the SET UP DISPLAYS routine, the binary coded decimal code for digits to be displayed, such as from the CPOS routine, are converted to seven segment code to be utilized by the DISPLAY interrupt routine. This places the digit data in appropriate format to drive the seven segment displays.

Referring now to FIG. 8, the DISPLAY routine is executed on an interrupt basis and is entered approximately 300 times per second. When the MAIN routine is interrupted by the DISPLAY routine, at the conclusion of the execution of the DISPLAY routine, the MAIN routine is re-entered at the point at which it was interrupted. The DISPLAY routine is basically concerned with activating the digits of the three digit LED display.

Upon entering the routine, the various registers which were being used by the MAIN routine are saved for subsequent use by the MAIN routine. The DISPLAY routine first turns off the digit drivers and then reads and stores the conveyor length. The coast compensation and offset values are also read and saved.

Next, each of the three columns of the keyboard are read and saved. As discussed earlier in regard to the circuit of FIG. 6, the means for enabling each of these groups of input values is the setting of an appropriate output of the group of outputs 51 from the display driver 41.

Next, the display pointer is updated. The display pointer indicates which one of the three digits of the LED display is to be activated. Each time the DISPLAY routine is executed, the display pointer is advanced to the next digit so that every third execution of the DISPLAY routine energizes a particular digit.

Next, a blanking bit is checked, and if it is set, then the routine skips past the activation of the selected digit of the LED display. As shall be described, this blanking bit, which is set in regard to either an error indication or an indication of a position being input through the keyboard, is present approximately every other second in order to produce a flashing display of either an error code or an entered conveyor position.

If the blanking bit is not set, the digit drivers are activated and the appropriate segment data is coupled to the drivers to energize the appropriate digit in the digit display. After the digit is activated, or after the presence of a blanking bit is noted, the routine next checks to see if an internal one second timer has timed out. If the timer has timed out, it is indicative of the passage of approximately one second in real time.

Since the DISPLAY routine is entered on the order of 300 times per second, the one second timer normally has not timed out. If it has not timed out, the routine sets the KEYBOARD ANALYSIS (KEYANL) and CHECK MOTOR (CKMOT) bits in the status byte of the register RAM07. The interrupt timer is then restarted so that the next interrupt period will be initiated and the registers are restored for the MAIN program, which then continues at the point at which it was interrupted.

If the time counter (the one second clock) has timed out to 0, a motor timer is decremented if it is not at 0. The motor timer will be at 0 unless the motor is running. When the motor is running, the motor timer is set for an arbitrary value, such as 130 seconds, and this motor timer is decremented during the DISPLAY interrupt routine each time the time counter counts down indicating the passage of one second. The motor timer is operative to turn off the motor if it is running continuously for more than the 130 seconds which corresponds to the 130 count in the motor timer.

Also when the one second timer has timed out, the DISPLAY routine obtains the status byte and checks bits 5 and 3 to determine if an error is being displayed or if the keyboard is currently inputting. If not, the COMPUTE POSITION bit is set in the status byte. If there is a keyboard input or an error set, the DISPLAY routine gets the blanking bit and inverts it. In this way, if the display is displaying a keyboard input or an error, the blanking bit will be set every other second. This blanks the display every other second and produces the effect of a flashing display for keyboard input or an error indication. After the inversion of the blanking bit, the DISPLAY routine proceeds to set the KEYBOARD and CHECK MOTOR bits in the status byte, and proceeds in the same manner as described above.

The processor is responsive to the entry of a requested conveyor position through the keyboard to activate the conveyor drive motor to move the conveyor to the desired location. A KEYBOARD ANAL- YSIS (KEYANL) routine of more or less conventional form is used to read the keyboard inputs so that they may be acted upon by the processor. The KEYANL routine receives and stores the keyboard input in binary coded decimal form. Subsequently, the SET UP DISPLAYS (SUDS) routine converts the binary coded decimal form to seven segment code. The KEYANL routine also debounces the key inputs. After the entry of a desired location through the keyboard, the operator of the control depresses an "enter" key, to which the KEYANL routine responds by setting the MOVE CONVEYOR bit (bit 7) in the status byte. Since the MOVE CONVEYOR routine has the highest priority in the status byte, the next time that the MAIN program is initiated, the conveyor is moved to the requested position.

In order to do this, a MOVE CONVEYOR (MOVCON) routine is executed as illustrated in FIG. 11. The MOVCON routine first determines if the motor driving the conveyor is already running. If so, the motor is stopped and an error code is set utilizing an error subroutine. As indicated earlier, when an error code is indicated, the particular error flashes in the display through the operation of the DISPLAY interrupt routine. There are error codes for each of the following conditions: depressing the "enter" key without having entered a number; entering a wrong number, such as a location higher than the number of locations of the conveyor as entered on the slide switches for conveyor length; slow conveyor response to command signals; a fault condition in the control itself; and the present condition in which the conveyor is already moving when a location number is entered.

If the motor is not already running, the requested position entered from the keyboard is converted from binary coded decimal to binary. The processor then gets the conveyor length from the slide switch setting and checks to determine if the input through the keyboard is greater than the conveyor length. If so, another one of the above-identified error codes is flashed on the display. If the input location is not greater than the length of the conveyor, then the motor timer is set, for the exemplary 130 seconds discussed earlier. This timer is, as described above, decremented in the operation of the DISPLAY interrupt routine.

The MOVCON routine then divides the conveyor location input by the conveyor length. This produces a desired proportional conveyor position. If there is an error in performing this division, the error code indicating a control circuit malfunction is flashed in the display. If there is no division error, then the offset from the offset slide switches is subtracted from the desired conveyor position which has been determined. At this point, the desired position is in its proportional or ratio form, and the offset is stored in that form. Therefore, a proportional value for the desired conveyor location which is free of the offset is produced. Next, the actual proportional conveyor position most recently derived by the CPOSR routine is subtracted, leaving a differential (in proportional terms) between desired and actual conveyor positions. If the difference is zero, no movement of the conveyor is necessary and the routine returns to the MAIN program.

The clockwise direction of travel of the conveyor is the direction of increasing position values. Therefore, if the proportional differential value is between 0 and $\frac{1}{2}$, the conveyor is moved clockwise. If the differential is between $-\frac{1}{2}$ and 0, the conveyor is moved counterclockwise, and if the differential is greater than or equal to $\frac{1}{2}$ and less than 1, the conveyor is also moved counterclockwise. In all other cases, the conveyor is moved clockwise.

The MOVE subroutines, for clockwise or counterclockwise movement of the conveyor, operate to activate the conveyor motor to drive the conveyor in the appropriate direction by setting the appropriate direction bit to drive one of the triacs such as 57. The actual firing of the appropriate triac through either the multivibrator 52 or the multivibrator 53 is performed by the CHECK MOTOR (CKMOT) routine, to be described hereinafter.

At the end of each of the MOVE subroutines, not only is the appropriate direction bit set for use by the CHECK MOTOR routine, but the coast compensation factor entered through the group of slide switches 40 is taken into account to modify the non-offset stop value position. The stop value position which is to be modified by the coast factor is obtained after subtracting the offset from the proportional value of the desired position. In the case of clockwise movement, the coast compensation factor is subtracted from the stop value, and in the case of counterclockwise movement, the coast compensation factor is added. The stop value, modified by coast, is stored for use by the CHECK MOTOR routine.

It will be recalled from the DISPLAY interrupt routine of FIG. 8, that upon each execution of the interrupt routine, approximately 300 times per second, the CHECK MOTOR bit is set in the status byte. Therefore, each time the MAIN program is initiated, this program will first execute the MOVE CONVEYOR routine, if it is set, and then execute the CHECK MOTOR routine. Therefore, the CHECK MOTOR routine is frequently updated, usually approximately every three milliseconds.

The CHECK MOTOR routine checks to see if the motor is running, and if it is, checks to see if the motor timer has timed out. If it has, the motor is stopped and an error flag is set. If the motor timer has not timed out, an updated proportional position CPOSR calculation is performed. The routine then recalls the coast-compensated stop value stored by the MOVE CONVEYOR routine. If the clockwise direction bit is set, the actual proportional position from the CPOSR routine is subtracted from the coast-compensated stop value. For counterclockwise motion, the stop value is subtracted from the proportional position. If the result of the appropriate subtraction is less than or equal to zero, then the motor is stopped. If the result of the subtraction is greater than zero, the CHECK MOTOR routine fires the appropriate one shot multivibrator so that its associated triac continues to be turned on to activate the motor.

In order to set the conveyor length in the group of slide switches 39, all of the switches are placed in the on position and selectively moved to the off position to establish the length setting. The eight switches can be set to establish, in binary form, a conveyor length between 2 and 255. These numbers correspond to the number designations such as for the links of the conveyor chain being driven. This length in terms of links is the value used by the processor 37 to convert the position designations input through the keyboard into proportional positions. If all of the switches are set to the on position, the processor recognizes this setting as a conveyor having the length of 1,000. To set the switches 39 for a conveyor having a length of 100, only the switch coupled to the port P00 corresponding to the least significant bit is set to the off position.

After the length of the conveyor has been set on the length switches 39, the offset switches 38 may be set. In order to do this, the zero position on the conveyor is moved to the call counter or other desired location. The zero location on the conveyor is at the same position or link as the last number on the conveyor. When this location has been moved adjacent the call counter, the offset switches are set so that the conveyor position displayed on the LED readout is 0. Unlike the conveyor length switches, the offset switches are interpreted by the processor as proportional offset distances. Therefore, a range of offsets may be entered between 0 and 1, in increments of 1/256.

Finally, the coast switches 40 may be set. The switches are initially all placed in the on position. The coast compensation switches are in proportional form rather than absolute values. The desired setting is obtained by moving the conveyor by means of a directional switch, such as the switch 27, in one direction approximately 1/10 of the conveyor length. The control keys are then used to return the conveyor to, for example, the zero position. The stopping point is observed and marked. Then the conveyor is moved in the opposite direction about 1/10 of the conveyor length, and the keys are used to return to the same zero position. This stopping point is again observed and marked. The true zero lies between the two marks. Each of the switches is set by moving it to the off position to establish an appropriate amount of coast compensation, between zero and a maximum amount of compensation. The available coast compensation varies from about zero to about 1/32 in terms of proportional position in steps of 1/512.

The flow charts and operational descriptions herein for the processor 37 are embodied in an Intel 8022 custom integrated circuit. A complete listing of the program for the integrated circuit is attached hereto as an appendix and is specifically incorporated herein. Reference may be made to this program listing for any of the exact details of the operation of the processor 37 in the described control.

It is possible to utilize more than one control of the foregoing type with a particular conveyor. In this case, each control is coupled to the outputs of the conveyor position potentiometer and to the conveyor drive. The controls would typically be located at different locations along the conveyor path and would be operable independently. The setup and operation of each control would be substantially as described above for one control, with the particular offset value for each control being unique to its position along the conveyor path.

What is claimed is:

1. A control for positioning a conveyor in a conveyor arrangement that includes an endless conveyor which traverses a closed path, there being a series of particular locations along the conveyor, a conveyor drive responsive to an activating signal for driving the conveyor along the closed path, and means for producing an actual conveyor position signal indicative of a proportion of a complete traversal of the path by the conveyor, comprising:

means for storing an indication of the length of the conveyor;

means for receiving and storing an externally applied indication of a desired conveyor position in terms of one of said particular locations along the conveyor;

means, coupled to the actual conveyor position signal producing means and to the conveyor length storing means and responsive to the desired conveyor position indication of the receiving and storing means, for producing a desired conveyor position signal indicative of a proportion of a complete traversal of the path by the conveyor; and means for providing an activating signal to the conveyor drive to drive the conveyor until the actual conveyor position signal has a predetermined relationship to the desired conveyor position signal.

2. The control of claim 1 in which the means for providing an activating signal to the conveyor drive includes means for determining the shortest direction of travel for the conveyor to reach the desired position.

3. The control of claim 1 in which the predetermined relationship of the actual conveyor position signal to the desired conveyor position signal is equality.

4. The control of claim 1 which further comprises means for storing an externally applied setting of an offset value in terms of a proportion of a complete traversal of the closed path by the conveyor, and in which the means for providing an activating signal to the conveyor, and in which the means for providing an activating signal to the conveyor drive is coupled to this offset storing means and includes means for providing an activating signal to the conveyor drive to drive the conveyor until the actual conveyor position signal differs from the desired conveyor position signal by an amount equal to the offset value.

5. The control of claim 1 in which the means for storing an indication of the length of the conveyor comprises a slide switch arrangement through which the conveyor length is set in terms of the number of said particular locations along the conveyor.

6. The control of claim 1 in which the means for producing a desired conveyor position signal and the means for providing an activating signal to the conveyor drive each include means for generating an error code in the case of a fault condition.

7. The control of claim 1 which further comprises means for displaying said externally applied indication of a desired conveyor position in terms of one of said particular locations along the conveyor.

8. The control of claim 7 in which the means for producing a desired conveyor position signal and the means for providing an activating signal to the conveyor drive each include means for generating an error code in the case of a fault condition.

9. The control of claim 8 in which the display means is also operable to display said error codes.

10. A control system for a conveyor comprising a plurality of controls according to claim 1 each coupled to the actual conveyor position signal producing means and to the conveyor drive.

11. A control for positioning a conveyor in a conveyor arrangement that includes an endless conveyor which traverses a closed path, there being a series of particular locations along the conveyor, a conveyor drive responsive to an activating signal for driving the conveyor along the closed path, and means for producing an actual conveyor position signal indicative of a proportion of a complete traversal of the path by the conveyor, comprising:

means for storing an indication of the length of the conveyor;

means for receiving an externally applied indication of a desired conveyor position in terms of one of said particular locations along the conveyor;

means, coupled to the conveyor length storing means, for converting said externally applied indication of a desired conveyor position to a desired conveyor position signal indicative of a proportion of a complete traversal of the path by the conveyor; and means, responsive to the actual conveyor position signal and to the desired conveyor position signal, for providing an activating signal to the conveyor drive to drive the conveyor until the actual conveyor position signal has a predetermined relationship to the desired conveyor position signal.

12. The control of claim 11 which further comprises means, coupled to the actual conveyor position signal producing means and to the conveyor length storing means, for producing a display of the position of the conveyor in terms of a location of the series of particular locations along the conveyor.

* * * * *

UNITED STATES PATENT AND TRADEMARK OFFICE
CERTIFICATE OF CORRECTION

PATENT NO. : 4,484,288
DATED : November 20, 1984
INVENTOR(S) : Don H. Riemenschneider It is certified that error appears in the above-identified patent and that said Letters Patent is hereby corrected as shown below:

In column 2, line 23, after "objects", insert --.--.

In column 14, line 24, delete "and in which".

In column 14, line 25, delete the entire line.

In column 14, line 26, delete "veyor,".

Signed and Sealed this

Ninth Day of April 1985

[SEAL]

*Attest:*

DONALD J. QUIGG

*Attesting Officer*     *Acting Commissioner of Patents and Trademarks*